US006957196B1

(12) United States Patent
Cordery et al.

(10) Patent No.: US 6,957,196 B1
(45) Date of Patent: Oct. 18, 2005

(54) METHOD FOR AUDITING A DATABASE AND SYSTEM FOR CARRYING OUT SUCH METHOD

(75) Inventors: Robert A. Cordery, Danbury, CT (US); Richard W. Heiden, Huntington, CT (US); Perry A. Pierce, Darien, CT (US); Kevin L. Strobel, Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 742 days.

(21) Appl. No.: 09/654,951

(22) Filed: Sep. 5, 2000

(51) Int. Cl.[7] ......................... G06F 17/60; G06F 17/00
(52) U.S. Cl. ......................................... 705/60; 705/401
(58) Field of Search .................... 705/60–61, 400–405, 705/64; 379/147; 714/1–7, 48, 100; 902/38

(56) References Cited

U.S. PATENT DOCUMENTS

| | | | | |
|---|---|---|---|---|
| 5,367,464 A | * | 11/1994 | Abumehdi et al. | 364/464.02 |
| 5,742,683 A | * | 4/1998 | Lee et al. | 380/23 |
| 5,778,076 A | * | 7/1998 | Kara et al. | 380/51 |
| 5,805,711 A | * | 9/1998 | Windel et al. | 380/55 |
| 6,061,668 A | * | 5/2000 | Sharrow | 705/400 |
| 6,076,072 A | * | 6/2000 | Libman | 705/34 |

FOREIGN PATENT DOCUMENTS

EP 0 854 446 A2 * 7/1998 .......... G07B 17/00

OTHER PUBLICATIONS

Vanasco, Rocco R, "Fraud Auditing", Managerial Auditing Journal v13n1, pp 4-71, 1998, ISSN: 0268-6902.*

* cited by examiner

*Primary Examiner*—James P. Trammell
*Assistant Examiner*—Mary Cheung
(74) *Attorney, Agent, or Firm*—Charles R. Malandra; Angelo N. Chaclas; George M. Macdonald

(57) ABSTRACT

FIG. 6 shows the operation of modules 22 in processing a request for a digital postal indicium. At 72 the selected one of modules 22 receives the indicium request and the requested meter record and, at 76 confirms that sufficient funds are available. If not the request is rejected at 78; again in a manner whose details form no part of the subject invention. At 80 the selected module constructs an indicium message having an appended indicium signature, which when printed in relevant part on a mailpiece will evidence payment of postage in the amount shown, and at 84 updates the requested meter record and appends a meter record signature. Generation of indicia and updating meter records is more fully described in specifications for the Information Based Indicia Program (IBIP) published by the United States Postal Service and further discussion is not believed necessary for an understanding of the subject invention.) At 86 the selected module updates the audit data. (Updating the postage and transaction data is a matter of simple addition. Updating of the error correcting code will be described further below.) At 88 the updated audit data is stored in nonvolatile memory 24, and at 90 the signed indicium message and signed meter record are sent to server 14 for processing as described above. The audit data and the indicium are transmitted to the server at the same time. The indicium is forwarded to customer 12 and a copy of the audit data is stored in server 14. While perhaps less secure than data stored in modules 22, audit data stored in server 14 can be verified against that in modules 22 and can be used, for example, when a module is off-line.

32 Claims, 6 Drawing Sheets

Meter Record

- Device ID
- License ID
- Transaction ID
- Ascending register
- Descending register
- Date of last refill
- Origin ZIP code
- Piece Count
- Meter encrypted private key
- Cryptographic module signature

FIG. 2

Indicium Request

- Device ID
- Postage Amount
- Rate Category
- Destination address data

FIG. 3

METHOD FOR AUDITING A DATABASE AND SYSTEM FOR CARRYING OUT SUCH METHOD

BACKGROUND OF THE INVENTION

The subject invention relates to the verification and auditing of records in a database. More particularly, it relates to verification and auditing of records relating to various users who can access or update the records through any of a plurality of modules.

With the explosive growth of digital communications systems where users can remotely access various types of accounts through any of a plurality of devices have become common. Perhaps the best known of such systems are the ubiquitous ATM's. Another such system is ClickStamp Online marketed by the assignee of the subject invention to transmit digital postal indicia in response to requests from mailers, which will be described further below. Commonly, in such systems a central server maintains a record or records of transactions by each user in a database. Clearly, unauthorized alteration of such records can cause large losses for system operators or users.

Thus it is an object of the subject invention to provide a method for generating and maintaining audit data which can be used to audit and verify such databases.

BRIEF SUMMARY OF THE INVENTION

The above object is achieved and the disadvantages of the prior art are overcome in accordance with the subject invention by means of a method, and a database system for carrying out that method. The system includes: a data store storing a database including a plurality of records; a server maintaining the records; and a plurality of independent modules providing access to said records. In accordance with the method of the subject invention the modules are programmed to maintain a set of additive audit data in each module and increment a set of audit data maintained in one module when a record is accessed through that module and the server is programmed to sum the sets of audit data to generate system audit data and verify the database's integrity against the system audit data.

In accordance with one aspect of the subject invention the server is further programmed to receive user requests for access and send the user request and the requested record to a selected one of the modules, and the modules are further programmed so that the selected module updates the requested record in accordance with the request.

In accordance with another aspect of the subject invention the modules are further programmed so that the selected module incorporates encrypted information in the record to prevent generation of fraudulent records.

In accordance with another aspect of the subject invention the request includes a request for a digital postal indicium and the modules are further programmed so that the selected module generates and returns to the requesting user a digital postal indicium in accordance with the request, and updates the requested record in accordance with the request.

In accordance with still another aspect of the subject invention each of the modules is secured against tampering.

In accordance with still yet another aspect of the subject invention the sets of audit data comprise increments of a linear error correcting code for correcting a field of the records, whereby the audit data can be summed by the server to generate a system error correcting code to correct the field of the records.

In accordance with another aspect of the subject invention the corrected field contains a total postage amount for the corresponding record.

In accordance with another aspect of the subject invention the corrected field contains a total number of indicia dispensed for the corresponding record.

Other objects and advantages of the subject invention will be apparent to those skilled in the art from consideration of the detailed description set forth below and the attached drawings.

BRIEF DESCRIPTION OF THE DRAWINGS

FIG. 2 shows a schematic block diagram of the cryptographic modules of the system of FIG. 1 and includes a representation of audit data stored in the modules.

FIG. 3 is a representation of the information content of a request for a digital postal indicium.

DETAILED DESCRIPTION OF PREFERRED EMBODIMENTS OF THE INVENTION

Figure 1:
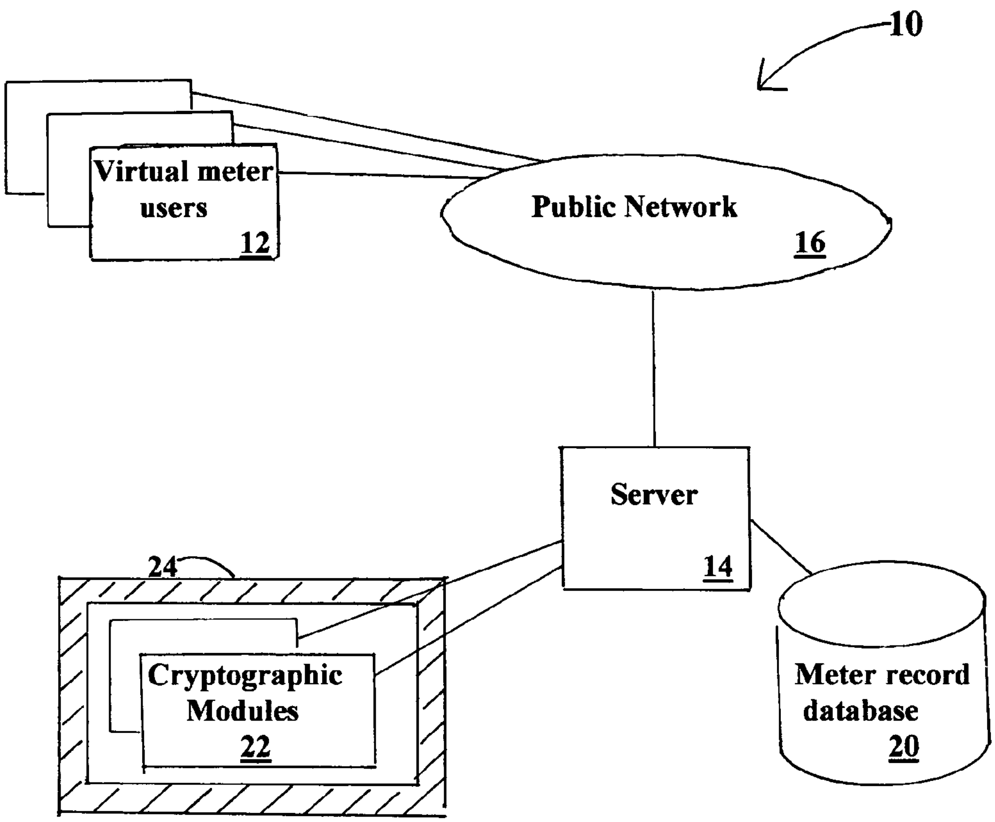
FIG. 1 shows a schematic block diagram of a system for dispensing digital postal indicia in accordance with the subject invention.

FIG. 1 shows database system 10 for providing digital postal indicia in response to requests from various users. System 10 is substantially similar to the ClickStamp Online marketed by the assignee of the subject invention with further adaptation to carry out the method of the present invention.

Users 12 who require a digital postal indicium send a request to server 14 through network 16, which can be any convenient mechanism for communication by a plurality of users, such as the public switched telephone network, the Internet, or a private network provided by the operator of system 10. Server 14 provides users 12 with access to meter record database 20 through cryptographic modules 22. Server 14 retrieves the requested meter record from database 20, selects an available one of modules 22, and sends the requested meter record and user request to the selected one of modules 22. Modules 22 generate a digital postal indicium in accordance with the request and update the requested meter record, as will be described further below.

Preferably, modules 22 are secured by a tamper resistant housing 24, and any other suitable techniques for preventing unauthorized access to modules 22 are also within the contemplation of the subject invention. (Housing 24 is shown as a single housing enclosing all of modules 22 but can also be a separate housing for each module.)

While modules 22 are shown as physically separate they can also be multiple instances of the cryptographic software running on single computer.

FIG. 2 shows the contents of a meter record stored in database 20 in one embodiment of the subject invention. Such records include: a Device ID identifying the record, a License ID evidencing authorization to generate indicia, a Transaction ID used to synchronize refill requests, an Ascending Register storing the total mount of postage generated through the meter record, a Descending Register storing the remaining amount of postage authorized (i.e., pre-paid), a Date of Last Refill storing the date of the last pre-payment for postage, an Origin ZIP Code identifying the location from which the mailpieces bearing the generated indicia will be mailed, a Piece Count of transactions processed, a Meter Private Encryption Key used to sign the digital postal indicia generated through the record, and a Cryptographic Module Signature generated by the last cryptographic module to update the record to prevent fraudulent alteration of the record. Other forms of incorporation of encrypted information to prevent fraud, such as encrypting all or part of the record without first generating a signature hash are also within the contemplation of the subject invention.

Those skilled in the postage meter art will recognize that meter records contain substantially the same information found in conventional free standing postage meters.

FIG. 3 shows the contents of a indicium request in one embodiment of the subject invention. In addition to the user's identity it includes: a Device ID identifying the meter record to be used, a Postage Amount for the requested indicium, a Rate Category for the requested indicium, and Destination Address Data for the corresponding mailpiece.

Figure 4:
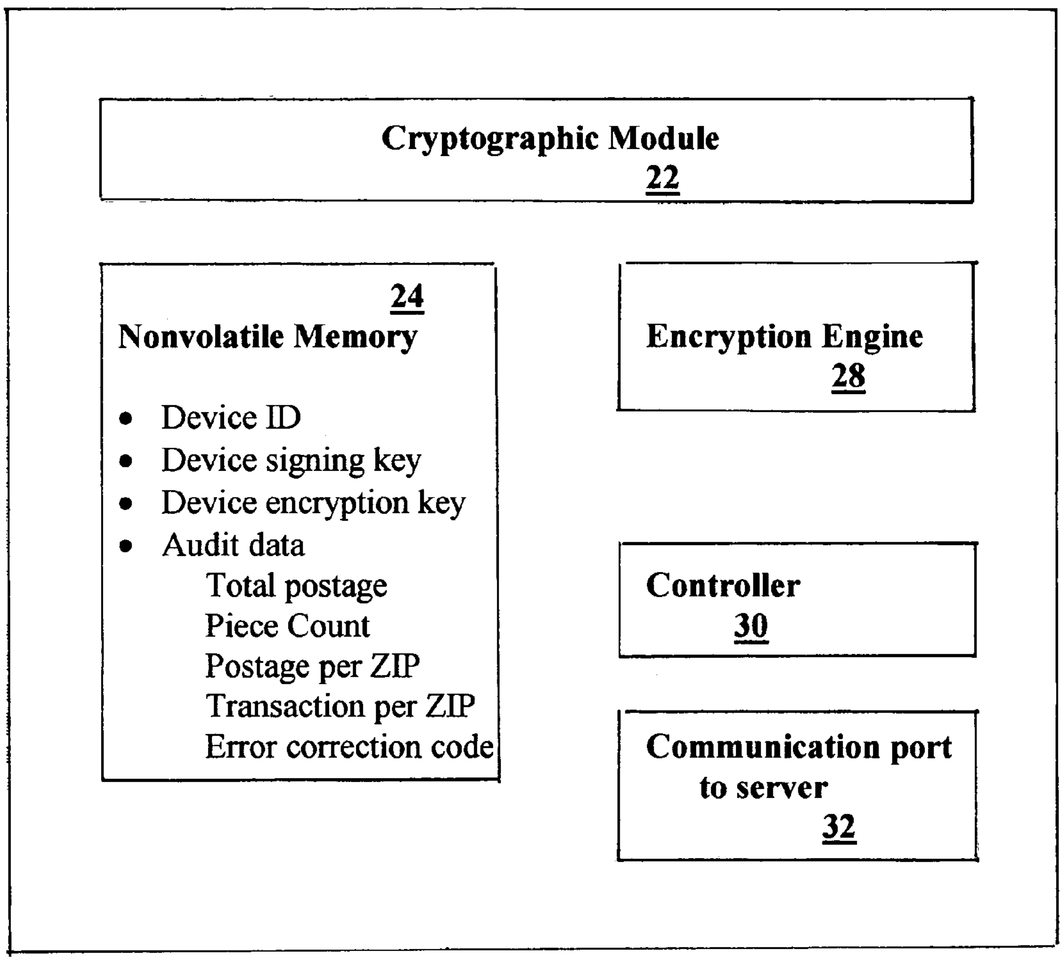
FIG. 4 is a representation of the information content of a meter record comprised in the database of the system of FIG. 1.

FIG. 4 shows a more detailed schematic block diagram of a cryptographic module 22. Module 22 includes nonvolatile memory 24 for secure storage of data, encryption engine 28 for performing cryptographic calculations, controller 30 for controlling the operation of module 22 and communications port 32 for communication with server 14.

In one embodiment of the subject invention nonvolatile memory 24 stores: Device ID's to identify a specific cryptographic module, Device Signing Keys to generate digital signatures when meter records are updated, Device Encryption Keys which decrypt Meter Private Encryption Keys stored in meter records and Audit Data for auditing database 20, which audit data can include: Total Postage processed through the module, Piece Count which represents the total number of transactions processed through the module, Postage per ZIP and Transactions per ZIP representing the above amounts on a per Origin Zip Code basis, and Error Correction Code Data from which a system error correction code can be generated, as will be further described below.

It should be noted that Audit Data is linear and can be combined by appropriate "summation" operations, as will be described further below, to generate system audit data so that modules 22 can operate independently, i.e., without need for communication among modules 22 for purposes of the subject invention.

Figure 5:
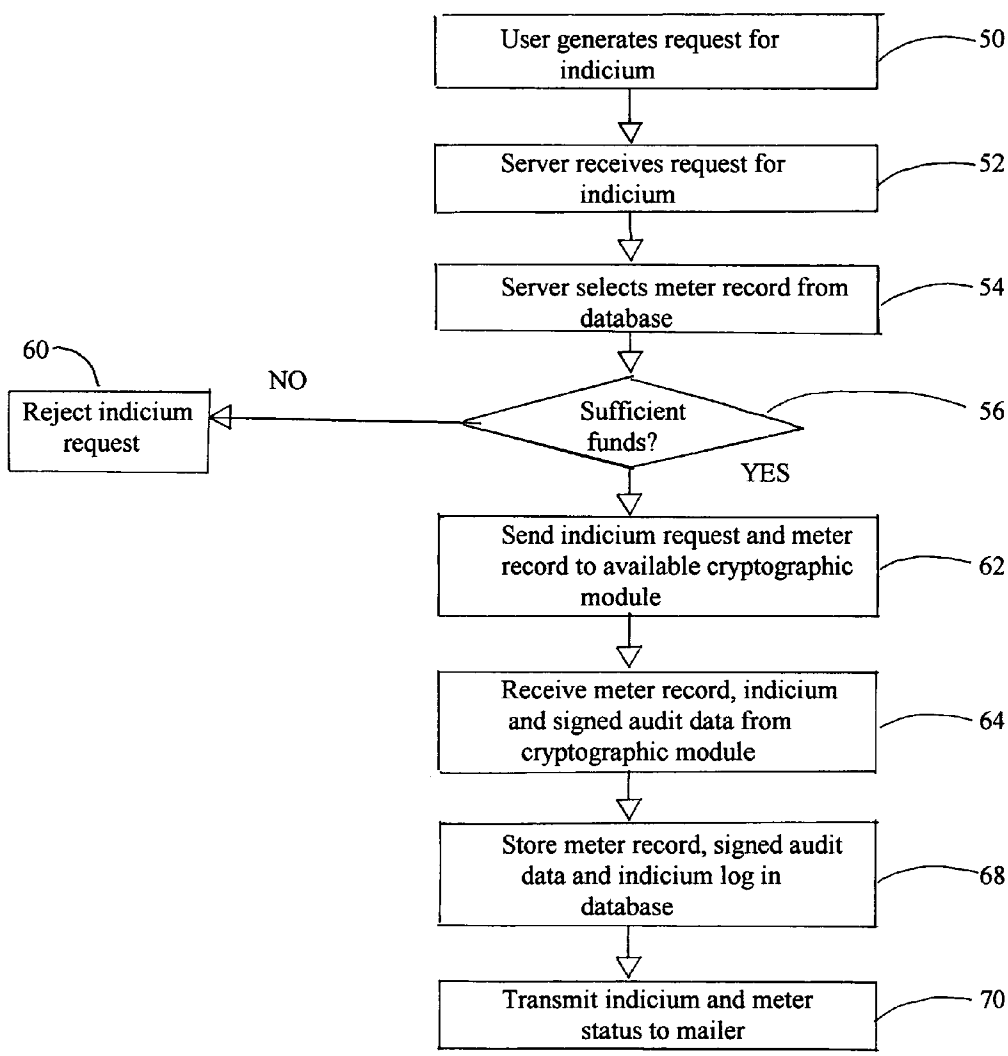
FIG. 5 shows a flow diagram of the operation of the server of the system of FIG. 1 in response to a request for a digital indicium.

FIG. 5 shows a flow diagram of the operation of server 14 in processing a request for a digital postal indicium. At 50 one of users 12 generates a request and sends it over network 16 to server 14. At 52 server 14 receives the request and at 54 selects the requested meter record from database 20 and confirms the user's authority to access that record. At 56 server 14 confirms that the requested meter record contains sufficient funds, and if not rejects the request at 60. (Details of the processing of rejected requests form no part of the subject invention.) If the requested record shows sufficient funds, at 62 server 14 selects an available one of cryptographic modules 22 and sends the request and requested meter record to the selected module, and waits. At 68 server 14 receives the updated meter record, including updated and signed audit data, and a digital postal indicium in accordance with the request. At 68 server 14 stores the updated record in database 20, and at 70 sends the indicium and meter status (e.g., pre-paid postage remaining) to the requesting user.

Figure 6:
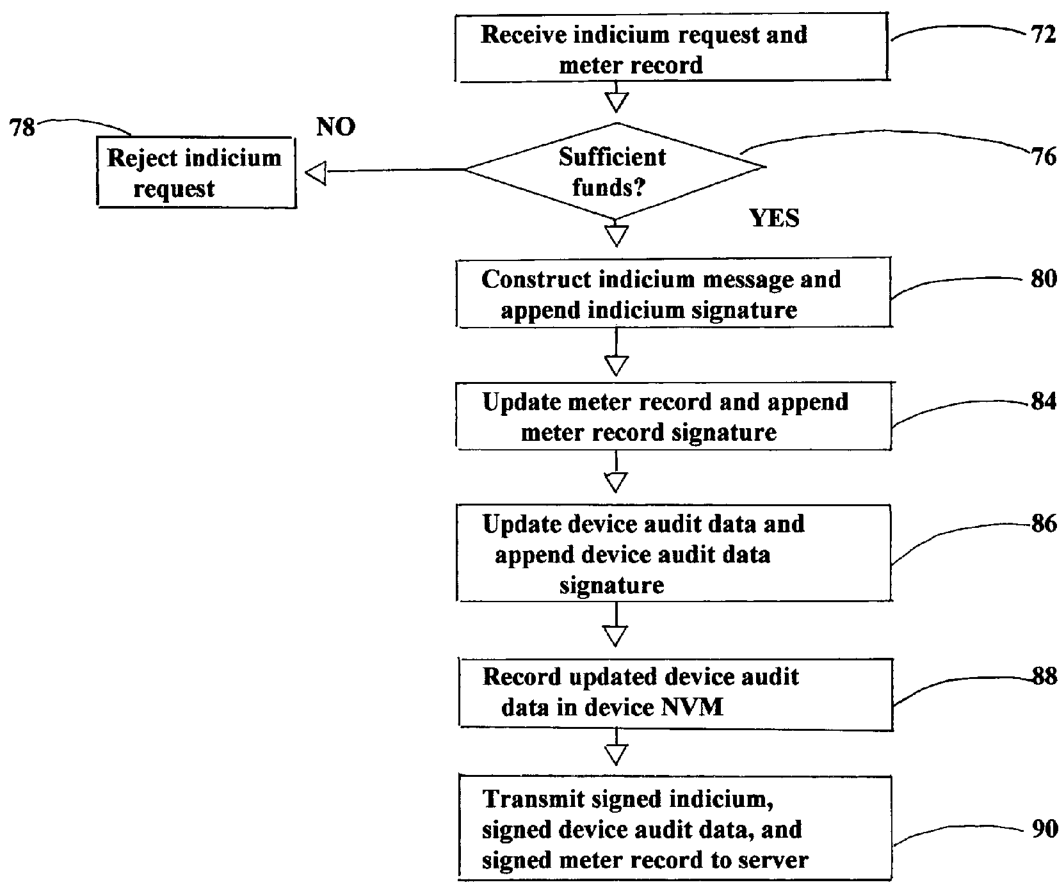
FIG. 6 shows a flow diagram of the operation of a cryptographic module of the system of FIG. 1 in response to a request for a digital indicium.

FIG. 6 shows the operation of modules 22 in processing a request for a digital postal indicium. At 72 the selected one of modules 22 receives the indicium request and the requested meter record and, at 76 confirms that sufficient funds are available. If not the request is rejected at 78; again in a manner whose details form no part of the subject invention. At 80 the selected module constructs an indicium message having an appended indicium signature, which when printed in relevant part on a mailpiece will evidence payment of postage in the amount shown, and at 84 updates the requested meter record and appends a meter record signature. Generation of indicia and updating meter records is more fully described in specifications for the Information Based Indicia Program (IBIP) published by the United States Postal Service and further discussion is not believed necessary for an understanding of the subject invention.) At 86 the selected module updates the audit data. (Updating the postage and transaction data is a matter of simple addition. Updating of the error correcting code will be described further below.) At 88 the updated audit data is stored in nonvolatile memory 24, and at 90 the signed indicium message and signed meter record are sent to server 14 for processing as described above. The audit data and the indicium are transmitted to the server at the same time. The indicium is forwarded to customer 12 and a copy of the audit data is stored in server 22. While perhaps less secure than data stored in modules 22, audit data stored in server 22 can be verified against that in modules 22 and can be used, for example, when a module is off-line.

Preferably, the audit data includes encrypted information to provide assurance of its authenticity. (As used herein the term "encrypted information" includes incorporation of a digital signature or encryption of all or portions of a message.) The audit data can also include time data to provide assurance that it is current.

Figure 7:
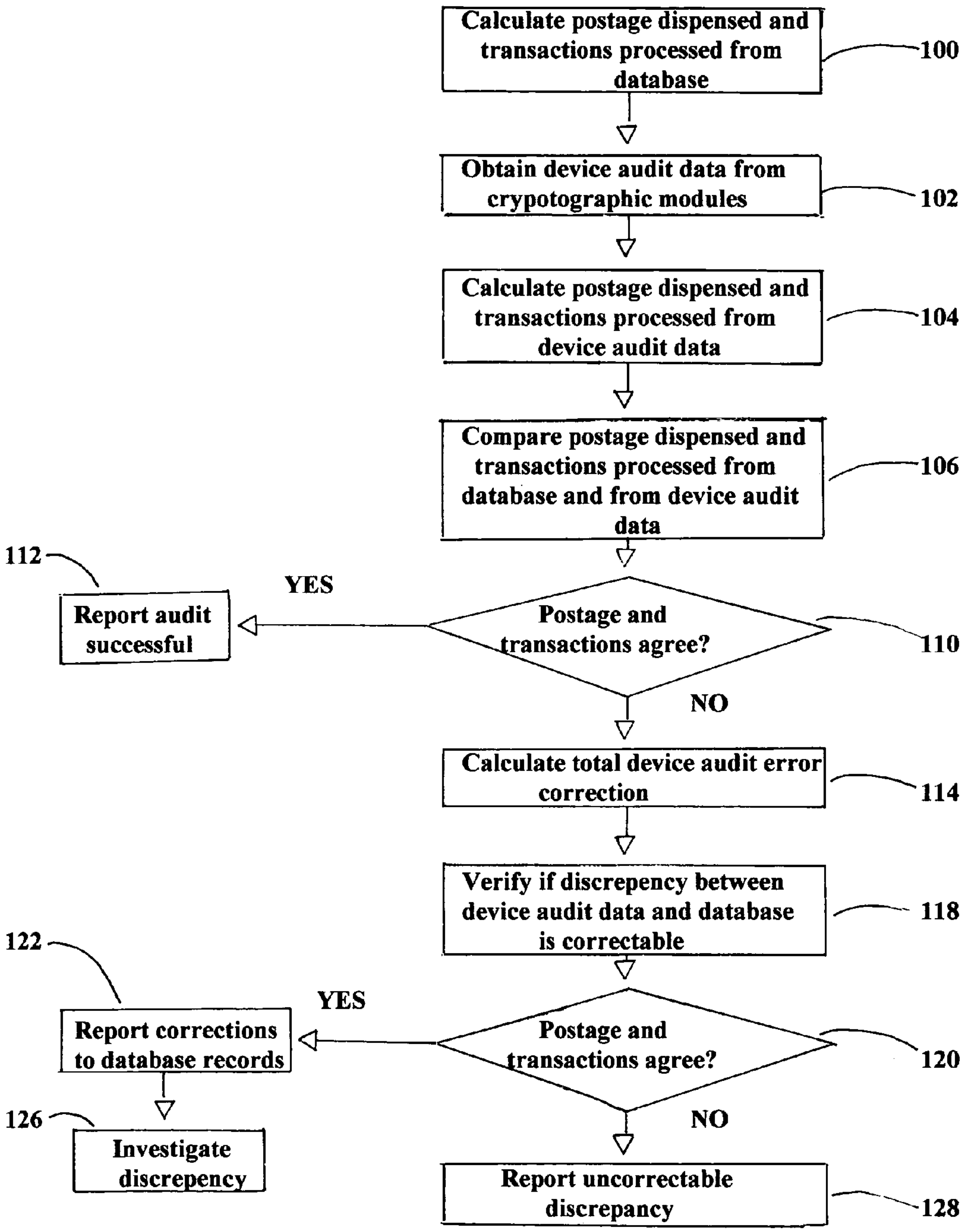
FIG. 7 shows a flow diagram of the operation of the server of the system of FIG. 1 in auditing the database.

FIG. 7 shows the operation of server 14 in auditing database 20. At 100 server 20 calculates the total postage dispensed and total number of transaction for database 20. In one embodiment this total is over the whole database. In another embodiment totals can be taken over each origin zip code. At 102 server 20 obtains the audit data from all of modules 22, and at 104 calculates the appropriate totals from the audit data. At 106 server 14 compares the totals determined from the database with the totals determined from the audit data, i.e. compares the total postage and number of transactions across the database with the totals across cryptographic modules 22. At 110 server 14 determines if the totals agree and, in one embodiment, if the totals agree reports a successful audit at 112.

If the totals are not equal or, in other embodiments where the operator of server 14 wishes to assure that amounts have been properly distributed over meter records even if the overall totals are correct, at 114 server calculates a system error correction code by appropriately "summing" the Error Correction Code Data from each of modules 22.

The system error correcting code can be any linear error correcting code and is preferably an example of the known Reed-Solomon code. In one embodiment of the subject invention:

a prime number $p=10{,}000{,}000{,}019$ $N=38{,}167{,}939$, and $\omega=245$, so that $\omega^N=1 \bmod p$ As is known, generator function for an (N, N-2t) Reed-Solomon code is given by:

$$g(x)=(x-\omega^{-1})(x-\omega^{-2}) \ldots (x-\omega^{-2t})$$

The resulting code can detect up to 2t errors, correct up to t errors and can be used for up to N-2t meter records. (By "error" herein is meant a code word, e.g. a field, with one or more incorrect entries.)

The total postage dispensed by system 10 can be expressed as a polynomial:

$$d(x)=A_0+xA_1+ \ldots +x^{N-2t-1}A_{N-2t-1}$$

where $A_M$ is the value of the Ascending Register for meter record M. (If M' does not exist $A_{M'}=0$) The corresponding error correction code polynomial is:

$$e(x)=-x^{2t}d(x) \bmod g(x)$$

and the error correcting code is the set of 2t coefficients of e(x).

When a selected one of modules 22 dispenses postage in the amount P for meter record M the increment to the Error Correction Code Data for that module is $-x^{2t+M}$ P mod g(x)

If t=1000 then each of modules 22 will keep a set of 2000 partial sums (mod g(x)) of the coefficients of e(x). Similar functions can be developed for the total number of transactions in a substantially identical manner.

At 114 server 14 will sum Error Correction Code Data from each of modules 22 mod g(x) to generate e(x) (and the error correcting code for the number of transactions).

At 118 server 14 applies these codes in a conventional manner to generate corrected meter records and at 120 verifies if the discrepancy identified at 110 is correctable by determining if the corrected meter records and sums determined for the total postage and number of transactions agree. If so at 122 server 14 reports the corrections to the database and at 126 investigates the discrepancy. Otherwise at 128 server 14 reports an uncorrectable discrepancy. Details of these reporting and investigating functions form no part of the present invention and will not be discussed further here.

The detailed design of systems such as system 10 and cryptographic modules such as modules 22 is well within the abilities of those skilled in the art, as is the program coding needed to carry out the functions described above and further description of such detailed design and coding is not believed necessary for an understanding of the subject invention.

The embodiments described above and illustrated in the attached drawings have been given by way of example and illustration only. From the teachings of the present application those skilled in the art will readily recognize numerous other embodiments in accordance with the subject invention. For example bank records, which are accessed through ATM's can be audited using the subject invention. Accordingly, limitations on the subject invention are to be found only in the claims set forth below.

What is claimed is:

1. A method for auditing a database comprising a plurality of records, said records each being accessible through at least one of a plurality of independent modules, said method comprising the steps of:

a) maintaining a set of additive audit data in each of said modules;

b) controlling said modules so that each module increments a set of audit data maintained in said module when a record is accessed through said module;

c) summing said sets of audit data to generate system audit data; and d) verifying said database's integrity against said system audit data, wherein the system audit data comprises the sum of all additive audit data stored in each of the plurality of independent modules.

2. A method as described in claim 1 comprising the further steps of:

a) sending a user request for access to a record and said requested record to a selected one of said modules; and b) said selected module updating said requested record in accordance with said request.

3. A method as described in claim 2 wherein said selected module incorporates cryptographically processed information in said record to prevent generation of fraudulent records.

4. A method as described in claim 3 wherein said request includes a request for a digital postal indicium and comprises the further steps of:

a) controlling said selected module to generate and return to said requesting user a digital postal indicium in accordance with said request; and b) controlling said selected module to update said requested record in accordance with said request.

5. A method as described in claim 2 wherein said selected module incorporates encrypted information in said audit data to authenticate said audit data.

6. A method as described in claim 2 wherein said selected module incorporates time information in said audit data.

7. A method as described in claim 1 comprising the further step of providing security against tampering for each of said modules.

8. A method as described in claim 1 wherein said sets of audit data comprise increments of a linear error correcting code for correcting a field of said records, whereby said audit data can be summed to generate a system error correcting code to correct said field of said records.

9. A method as described in claim 8 comprising the further steps of:

a) sending a user request for access to a record and said requested record to a selected one of said modules; and b) said selected module updating said requested record in accordance with said request.

10. A method as described in claim 9 wherein said request includes a request for a digital postal indicium and comprising the further steps of:

a) controlling said selected module to generate and return to said requesting user a digital postal indicium in accordance with said request; and b) controlling said selected module to update said requested record in accordance with said request.

11. A method as described in claim 10 wherein said corrected field contains a total postage amount for the corresponding record.

12. A method as described in claim 10 wherein said corrected field contains a total number of indica dispensed for the corresponding record.

13. A method as described in claim 8 wherein said sets of audit data further comprise arithmetic totals for values stored in said field of said records, whereby arithmetic sums of said values across said modules can be compared with arithmetic sums across said records, whereby numbers of errors greater than the number which can be detected by said system error correcting code can be detected.

14. A method as described in claim 13 wherein said field contains a total postage amount or a total number of indica dispensed.

15. A database system comprising:

a) a data store storing a database comprising a plurality of records;

b) a server maintaining said records;

c) a plurality of independent modules providing access to said records;

wherein d) said modules are programmed to maintain a set of additive audit data in each of said modules and increment a set of audit data maintained in one of said modules when a record is accessed through said one module;

e) said server is programmed to sum said sets of audit data to generate system audit data and verify said database's integrity against said system audit data, wherein the system audit data comprises the sum of all additive audit data stored in each of the plurality of independent modules.

16. A system as described in claim 15 wherein:

a) said server is further programmed to receive user requests for access and send said user request and said requested record to a selected one of said modules; and b) said modules are further programmed so that said selected module updates said requested record in accordance with said request.

17. A system as described in claim 16 wherein said modules are further programmed so that said selected module incorporates encrypted information in said record to prevent generation of fraudulent records.

18. A system as described in claim 17 wherein said request includes a request for a digital postal indicium and wherein said modules are further programmed so that said selected module generates and returns to said requesting user a digital postal indicium in accordance with said request; and updates said requested record in accordance with said request.

19. A system as described in claim 16 wherein said selected module incorporates encrypted information in said audit data to authenticate said audit data.

20. A system as described in claim 16 wherein said selected module incorporates time information in said audit data.

21. A system as described in claim 15 wherein each of said modules is physically secured against tampering.

22. A system as described in claim 15 wherein said sets of audit data comprise increments of a linear error correcting code for correcting a field of said records, whereby said audit data can be summed by said server to generate a system error correcting code to correct said field of said records.

23. A system as described in claim 22 wherein said modules are further programmed so that said selected module incorporates encrypted information in said record to prevent generation of fraudulent records.

24. A system as described in claim 23 wherein said request includes a request for a digital postal indicium and wherein said modules are further programmed so that said selected module generates and returns to said requesting user a digital postal indicium in accordance with said request; and updates said requested record in accordance with said request.

25. A system as described in claim 24 wherein said corrected field contains a total postage amount for the corresponding record.

26. A system as described in claim 24 wherein said corrected field contains a total number of indicia dispensed for the corresponding record.

27. A system as described in claim 22 wherein said sets of audit data further comprise arithmetic totals for values stored in said field of said records, whereby arithmetic sums of said values across said modules can be compared with arithmetic sums across said records, whereby numbers of errors greater than the number which can be detected by said system error correcting code can be detected.

28. A system as described in claim 27 wherein said field contains a total postage amount or a total number of indicia dispensed.

29. A method for auditing a database comprising a plurality of records, said records each being accessible through at least two of a plurality of independent modules, said method comprising:

maintaining a set of additive audit data in each of said modules;

controlling said modules so that each module increments a set of audit data maintained in said module when a record is accessed through said module;

summing said sets of audit data to generate system audit data; and verifying said database's integrity against said system audit data, wherein the system audit data comprises the sum of all additive audit data stored in each of the plurality of independent modules.

30. A method according to claim 29 further comprising:

controlling said modules so that each module sends a copy of audit data maintained in said module to a server after a record is accessed through said module.

31. A method according to claim 30 wherein:

summing said sets of audit data utilizes at least one set of the copy audit data maintained on the server.

32. A method according to claim 29 further comprising:

controlling said modules so that each module updates an error correcting code after a record is accessed through said module.

* * * * *